US012784162B2

(12) United States Patent
Jung

(10) Patent No.: US 12,784,162 B2
(45) Date of Patent: Nov. 3, 2026

(54) METHODS AND SYSTEMS FOR AUTOMATIC VIDEO QUALITY EVALUATION WITH FEATURE-BASED SELECTION MODELS

(71) Applicant: Tencent Europe (France) SAS, Paris (FR)

(72) Inventor: Joël Jung, Paris (FR)

(73) Assignee: TENCENT EUROPE (FRANCE) SAS, Paris (FR)

( * ) Notice: Subject to any disclaimer, the term of this patent is extended or adjusted under 35 U.S.C. 154(b) by 319 days.

(21) Appl. No.: 18/374,487

(22) Filed: Sep. 28, 2023

(65) Prior Publication Data

US 2024/0144453 A1 May 2, 2024

Related U.S. Application Data

(63) Continuation of application No. PCT/IB2021/000932, filed on Dec. 20, 2021.

(51) Int. Cl.
*G06T 7/00* (2017.01)
*G06V 10/764* (2022.01)
(Continued)

(52) U.S. Cl.
CPC .......... *G06T 7/0002* (2013.01); *G06V 10/764* (2022.01); *G06V 10/771* (2022.01);
(Continued)

(58) Field of Classification Search
CPC ......... G06T 7/0002; G06T 2207/10016; G06T 2207/20081; G06T 2207/20084; G06T 2207/30168; G06V 10/764; G06V 10/771; G06V 10/774; G06V 10/82; H04N 19/154; H04N 19/70
(Continued)

(56) References Cited

U.S. PATENT DOCUMENTS

2018/0121733 A1 5/2018 Joshi et al.

FOREIGN PATENT DOCUMENTS

WO 2021236059 A1 11/2021

OTHER PUBLICATIONS

De Cicco, Luca, Giuseppe Cilli, and Saverio Mascolo. "Erudite: a deep neural network for optimal tuning of adaptive video streaming controllers." Proceedings of the 10th ACM multimedia systems conference. 2019. (Year: 2019).*

(Continued)

*Primary Examiner* — Jonathan S Lee
(74) *Attorney, Agent, or Firm* — ARENTFOX SCHIFF LLP

(57) ABSTRACT

A method of predicting an objective quality score of an image or a video includes obtaining at least one selection feature associated with the image or video, and selecting, based on the at least one selection feature, a set of parameters among a plurality of sets of parameters of a learning based prediction model (LBPM). The selected set of parameters results from training the LBPM using training images or videos having the at least one selection feature. The method further includes determining the objective quality score of the image or video by applying the LBPM configured with the selected set of parameters, based on at least one qualifying feature associated with the image or video.

20 Claims, 5 Drawing Sheets

(51) Int. Cl.
*G06V 10/771* (2022.01)
*G06V 10/774* (2022.01)
*G06V 10/82* (2022.01)
*H04N 19/154* (2014.01)
*H04N 19/70* (2014.01)

(52) U.S. Cl.
CPC ............ *G06V 10/774* (2022.01); *G06V 10/82* (2022.01); *H04N 19/154* (2014.11); *H04N 19/70* (2014.11); *G06T 2207/10016* (2013.01); *G06T 2207/20081* (2013.01); *G06T 2207/20084* (2013.01); *G06T 2207/30168* (2013.01)

(58) Field of Classification Search
USPC .......................................................... 382/157
See application file for complete search history.

(56) References Cited

OTHER PUBLICATIONS

International Search Report issued Aug. 8, 2022 in Application No. PCT/IB2021/000932, pp. 1-18.

Nizami Imran Fareed et al: "No-reference image quality assessment using bag-of-features with feature selection", Multimedia Tools and Applications, Kluwer Academic Publishers, Boston, US, vol. 79, No. 11-12, Jan. 2, 2020, pp. 7811-7836.

* cited by examiner

[Fig.1]
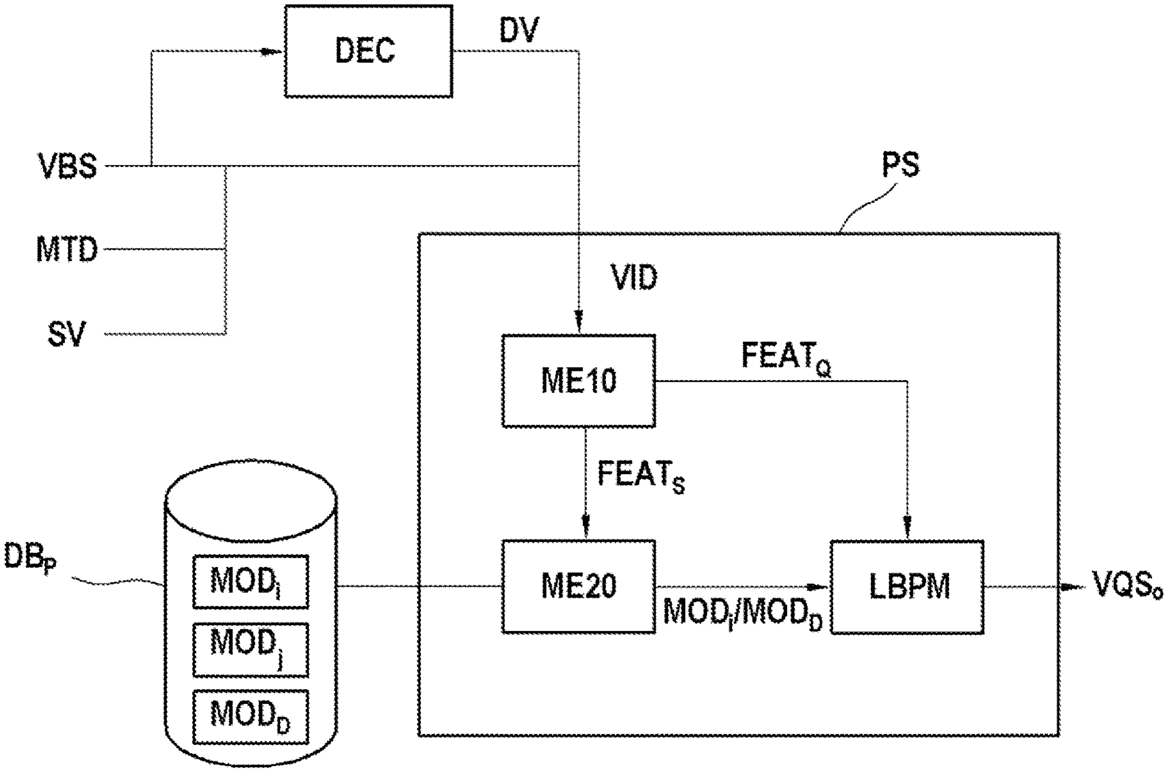
[Fig.2]
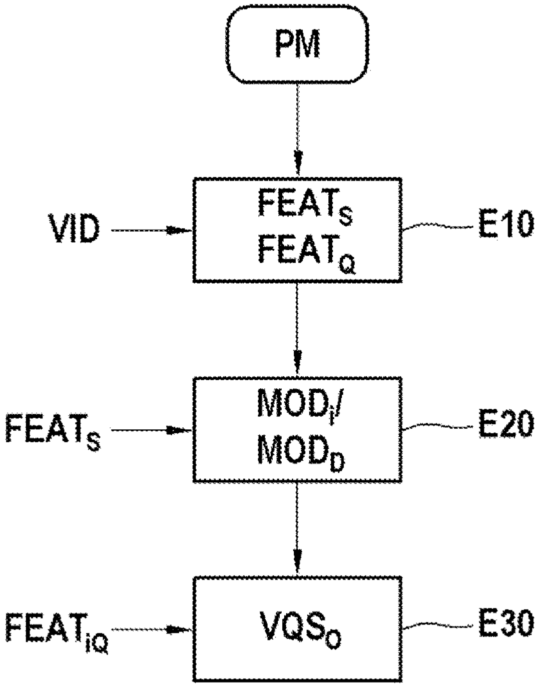

[Fig.3]
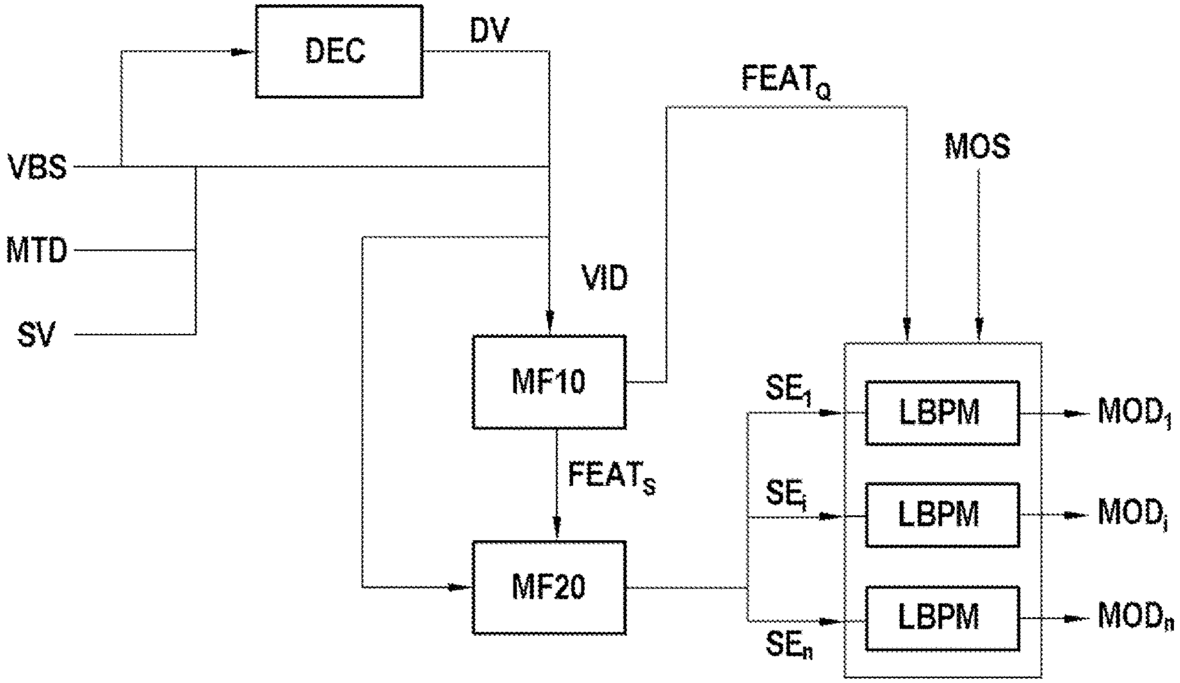
[Fig.4]
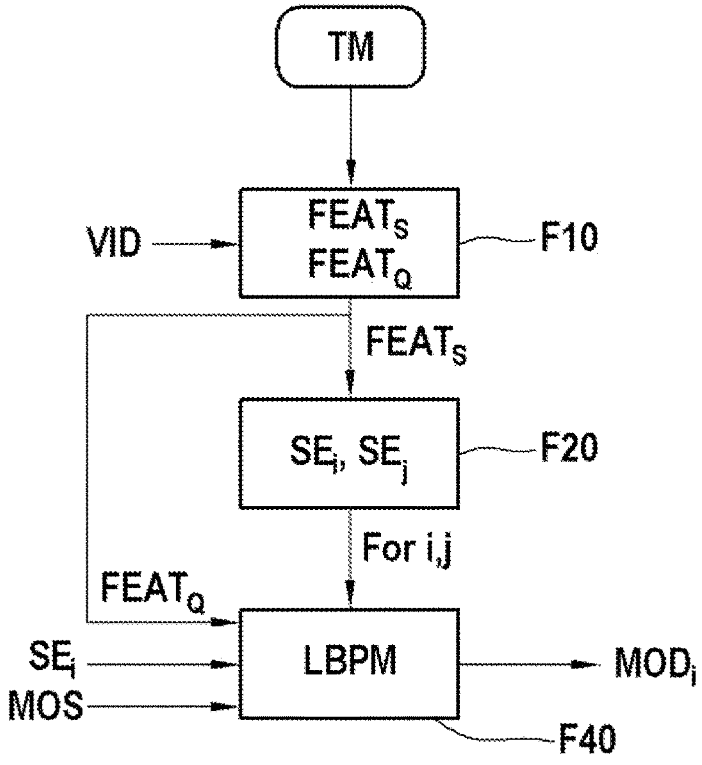

[Fig.5]
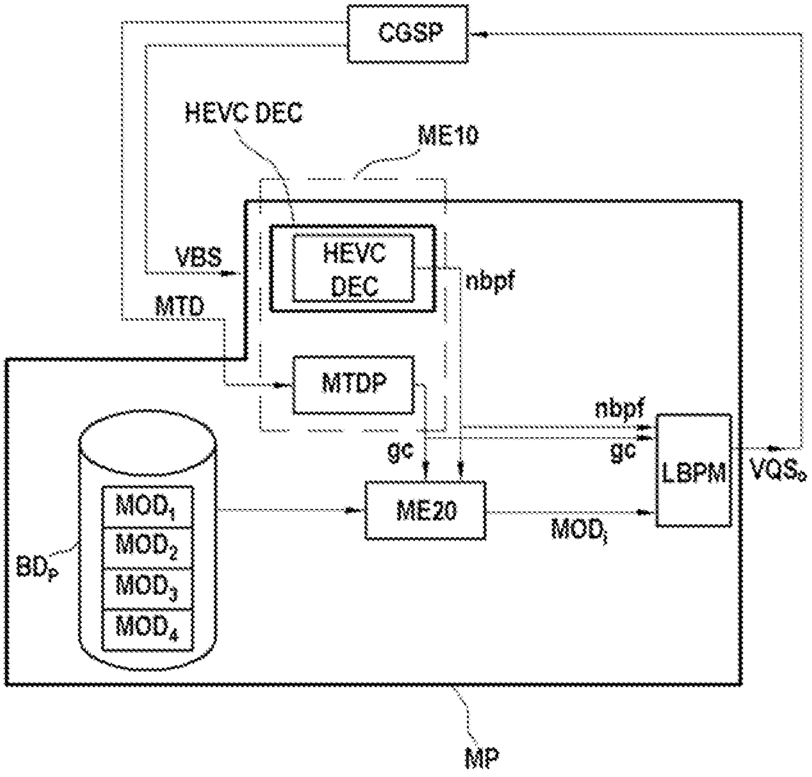

[Fig.6A]
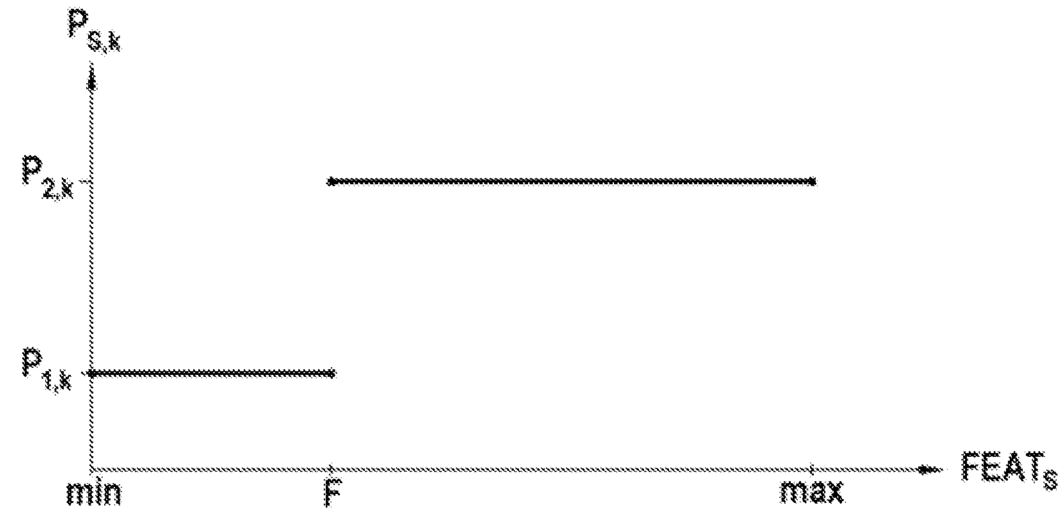
[Fig.6B]
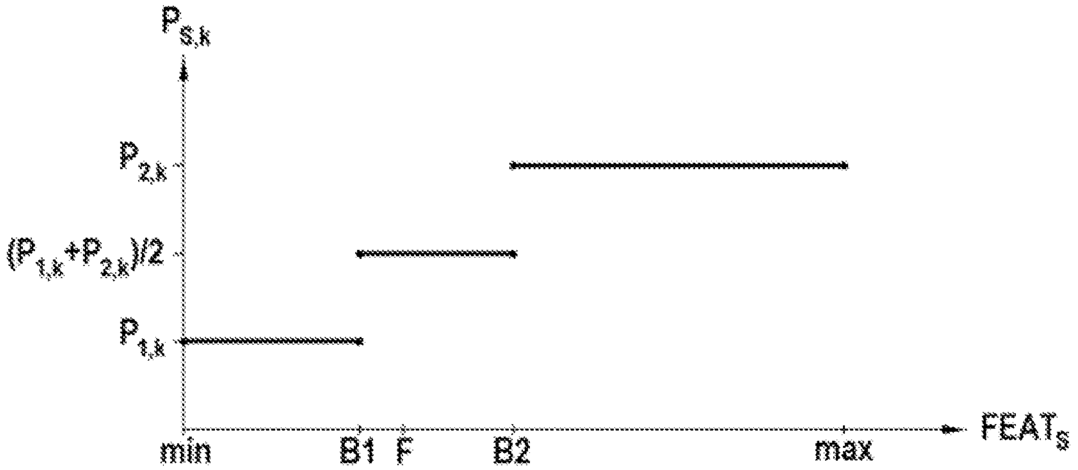
[Fig.6C]
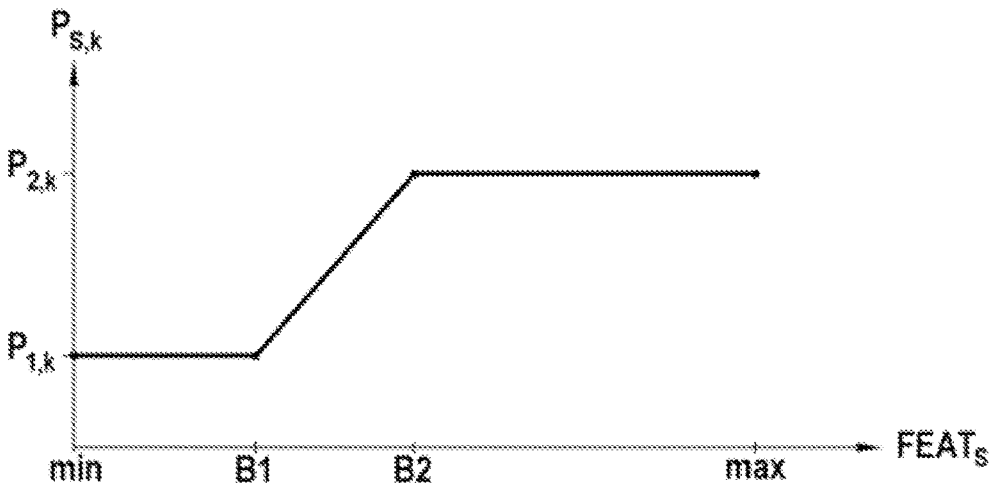

[Fig.7]
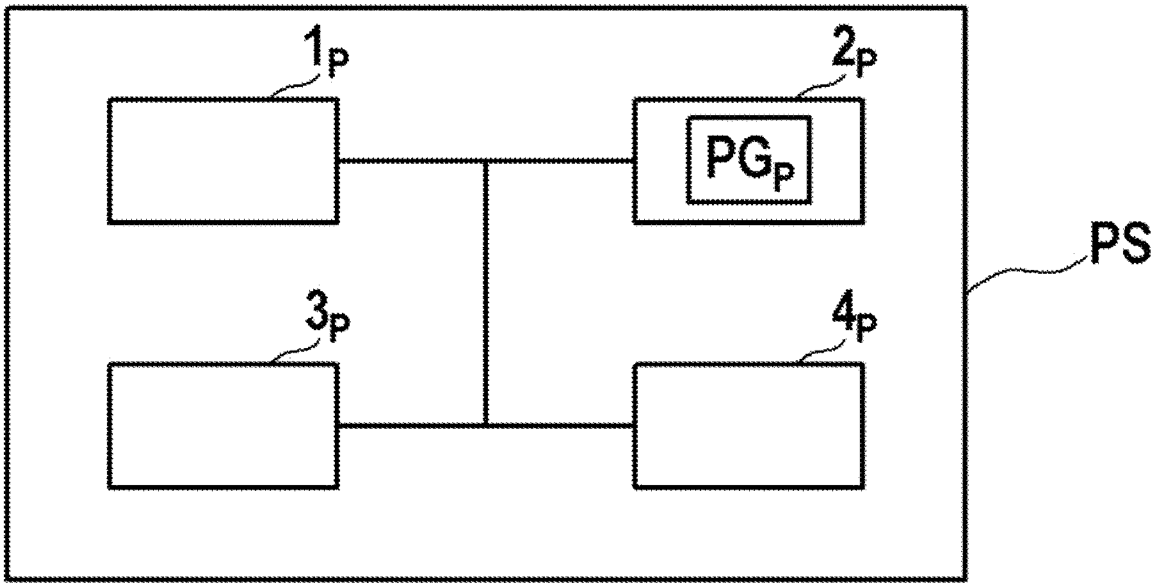
[Fig.8]
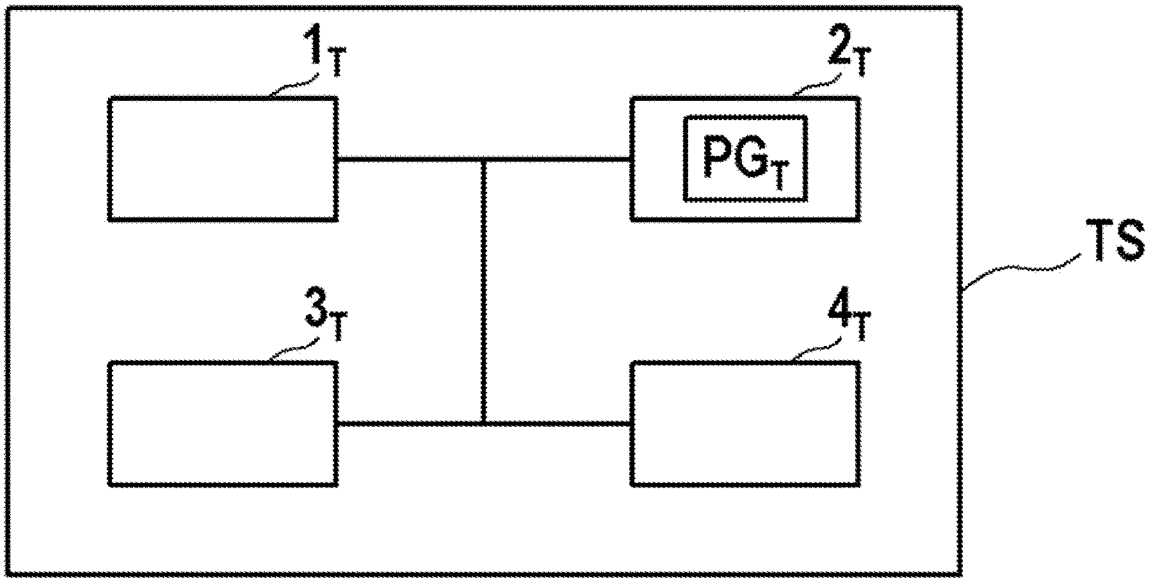

METHODS AND SYSTEMS FOR AUTOMATIC VIDEO QUALITY EVALUATION WITH FEATURE-BASED SELECTION MODELS

RELATED APPLICATION

This application is a continuation of International Application No. PCT/IB2021/000932, filed on Dec. 20, 2021, the entire content of which is incorporated herein by reference.

BACKGROUND OF THE INVENTION

The disclosure relates to the general field of video communication.

More specifically, the disclosure proposes systems and methods to improve the performance of image and video quality evaluation.

A context of this disclosure is the automatic evaluation of video quality, by so-called objective quality metrics. It includes the evaluation of the quality of all kinds of videos, in particular gaming and cloud-gaming video contents, 2D and immersive video contents.

For example, in a cloud-gaming application, a gamer may use a client device to access a game whose scenes are generated by a remote server. The gamer's motion and control information, obtained from the input device, is captured and transmitted from the client to the server. The client is usually a personal computer or mobile phone.

On the server side, the received motion and control information may affect the game scene generation. By analysing the generated game scenes and/or the user's motion and control information, the new scene is rendered by the game engine.

The corresponding raw video rendered by the game engine is encoded and the bit-stream is sent back to the client. On the client side, the bit-stream is decoded and the pictures of the game are displayed.

Objective quality evaluation refers to the evaluation of the perceptual quality of an image or a video, in order to predict in an automatic way the subjective quality as it would be perceived by human observers, typically through mean opinion scores.

In a cloud-gaming context, having a reliable objective metric is a key differentiating factor for a service provider. When used in the cloud, the metric allows to adapt the characteristics of the game engine and of the video coder, to ensure that the video stream sent to the user is of sufficient quality. When used at the client side, it provides important information on the quality as perceived by the user. When sent back to the server through a feedback channel, it can influence the behavior of the game engine and the coder.

Therefore, and not only in the context of cloud-gaming, automatic video quality evaluation is important at all steps of the video creation, transmission and rendering pipeline, because non automatic ways, such as subjective evaluation by human observers, are either not practical, or too expensive.

The automatic quality evaluation of videos has recently taken advantage of a new category of algorithms, based on learning, for example the ITU-T recommendations P.1203.1 and P.1204.3 (low-complexity learning-based objective bits stream based metric), the CNN based metric NDNetGaming, and the Deep Bilinear Convolutional Neural Network (DBCNN)

It is found that the quality scores predicted by such methods are not satisfactory.

OBJECT AND SUMMARY OF THE DISCLOSURE

The present disclosure is intended to overcome at least some of the above-mentioned disadvantages.

In an embodiment, a method of predicting an objective quality score of an image or a video includes obtaining at least one selection feature associated with the image or video, and selecting, based on the at least one selection feature, a set of parameters among a plurality of sets of parameters of a learning based prediction model (LBPM). The selected set of parameters results from training the LBPM using training images or videos having the at least one selection feature. The method further includes determining the objective quality score of the image or video by applying the LBPM configured with the selected set of parameters, based on at least one qualifying feature associated with the image or video.

In an embodiment, a method of determining parameters of a learning based prediction model (LBPM) from a set of images or videos includes classifying each image or video into a class based on the at least one selection feature of the respective image or video and identifying, for each class, a subset of the images or videos comprising only images or videos classified into the respective class. The method further includes training the LBPM only using the images or videos of said the respective subset, to generate a set of parameters for the LBPM such that an error is minimized between (i) objective quality scores of the images or videos of the respective subset calculated by the LBPM, when configured with the generated set of parameters, based on at least one qualifying feature associated with the images or videos of the respective subset and (ii) expected qualities associated with the images or videos of the respective subset.

In an embodiment, an apparatus for predicting an objective quality score of an image or of a video includes processing circuitry configured to obtain at least one selection feature associated with the image or video, and select, based on the at least one selection feature, a set of parameters among a plurality of sets of parameters of a learning based prediction model (LBPM). The selected set of parameters results from training the LBPM using training images or videos having the at least one selection feature. The processing circuitry is further configured to determine the objective quality score of the image or video by applying the LBPM configured with the selected set of parameters, based on at least one qualifying feature associated with the image or video.

In an embodiment, a non-transitory computer-readable storage medium stores computer-readable instructions which, when executed by a computer device, cause the computer device to perform a method of predicting an objective quality score of an image or of a video that includes obtaining at least one selection feature associated with the image or video, and selecting, based on the at least one selection feature, a set of parameters among a plurality of sets of parameters of a learning based prediction model (LBPM). The selected set of parameters results from training the LBPM using training images or videos having the at least one selection feature. The method further includes determining the objective quality score of the image or video by applying the LBPM configured with the selected set of parameters, based on at least one qualifying feature associated with the image or video.

In an embodiment, a non-transitory computer-readable storage medium stores computer-readable instructions which, when executed by a computer device, cause the computer device to perform a method of determining parameters of a learning based prediction model (LBPM) from a set of images or videos that includes classifying each image or video into a class based on the at least one selection feature of the respective image or video and identifying, for each class, a subset of the images or videos comprising only images or videos classified into the respective class. The method further includes training the LBPM only using the images or videos of said the respective subset, to generate a set of parameters for the LBPM such that an error is minimized between (i) objective quality scores of the images or videos of the respective subset calculated by the LBPM, when configured with the generated set of parameters, based on at least one qualifying feature associated with the images or videos of the respective subset and (ii) expected qualities associated with the images or videos of the respective subset.

As presented in details below, the disclosure relates to learning-based objective image or video quality metrics that can select a category according to feature(s) and apply a different network architecture/model/set of hyper parameters depending on the selected category. The switch from one model to another is performed at the image level, bloc level, etc. Features can be read from a bitstream, from metadata, derived from parsed syntax elements, derived from pixels. The models can further be derived/interpolated from each other for finer granularity.

According to this disclosure, the objective evaluation may be performed right after the encoding, before the transmission, to impact on the encoder itself, or in the cloud, or in the client to have accurate information on the quality received by the customer of a video/gaming service.

As detailed hereafter, the disclosure concerns (i) a method and a system of predicting the objective quality score of an image or of a video and (ii) a method and a system of determining a set of parameters of a learning based prediction method from a set of images or videos.

The videos used in the disclosure may be

- source videos captured by a camera or generated by a computer; or
- decoded videos obtained by decoding video bit streams and containing decoded pixels of the videos.

When the video is obtained by decoding a video bit stream, a feature associated with the video may be a syntax element directly parsed from (ie. read from) this video bit stream. For example, a feature associated to a video may be a profile (random access/low delay/ . . . ) used by the coder.

When the video is obtained by decoding a video bit stream, a feature associated with the video may be a value calculated from syntax elements parsed from the video bit stream. For example, the coding mode (intra/inter/skip) is obtained for each block and the feature associated with the video bit stream it related to the percentage of these coding modes.

When the video is obtained by decoding a video bit stream, a feature associated with the video may be an element obtained by decoding the video bit stream, for example a pixel or a motion vector.

When the video is obtained by decoding a video bit stream, a feature associated with the video may be a value calculated from elements obtained by decoding the video bit stream. For example, a feature may be an indicator of whether a given image zone is a contour zone or not, the contours being calculated from the decoded pixels. For example; a feature may also be obtained from an histogram calculated on the decoded pixels. For example, a feature may be a global motion calculated for an image, from the motion vectors.

When the video is a source video, a feature associated with the video may be a value calculated from elements of the source videos, for example from pixels or motion vectors of the source video. For example, a feature may be an indicator of whether a given image zone is a contour zone or not, the contours being calculated from the pixels of the source video. For example; a feature may also be obtained from an histogram calculated on the pixels of the source video. For example, a feature may be a global motion calculated for an image, from the motion vectors.

In one embodiment of the predicting method, a default set of parameters is selected if no set of parameters may be selected as a function of at least one selection feature. This situation may in particular occur:

- if the predicting system fails to obtain a selection feature; or
- if the predicting system fails to select a set of parameters as a function of a selection feature.

To differentiate from related limitations, the disclosure proposes to mix machine learning technique with traditional algorithmic approaches.

While in the state of the art the model is evolving and converging towards a single model during the training step, in this disclosure the same applies for several models, but the final model that is used at a certain granularity may evolve over time during the prediction, by automatic choices among several models according to some features, based on several existing/trained models or derived models.

The methods of the disclosure improve the quality of the prediction, so of the resulting quality score. Another effect of the disclosure is the reduction of the complexity. For instance, in the context of cloud-gaming, it may be assumed that:

- a first category defined by a first set of features (e.g. chess like games) can produce accurate quality scores with simple learning based prediction methods, made for instance of a simple linear regression model based on one single feature;
- a second category defined by a second set of features (e.g. flight simulation) can produce accurate quality scores only with a complex deep network with multiple layers and several features involved.

The selection of a model, or more generally of a set of parameters of the learning based prediction method, based on the type of game, or more generally on a feature associated with an image or with a video, allows to reach a lower complexity on average.

The methods of the disclosure provide better objective scores than the learning-based methods of the prior art which learn a generic model that can provide a score for any input content, the model being learnt on a training set made of various contents, gathering all characteristics of the content.

In one embodiment of the training method and of the predicting method; any of said selection feature or qualifying feature is extracted either from said video or from metadata associated with said video, or computed from features extracted from said video.

In one embodiment, any of said selection feature or qualifying feature is:

when the video is obtained by decoding a video bit stream, a syntax element extracted from said video bit stream; or a value calculated from the values of pixels of the image or of the video when the video is a source video or a decoded video.

The automatic quality evaluation of videos has recently taken advantage of a new category of algorithms, based on learning, including machine learning, neural networks, convolutional neural networks, etc. The proposed disclosure concerns all kind of learning based prediction methods: full-reference, no-reference, pixel-based, bitstream-based, etc.

In one embodiment, said learning based prediction method comprises a function, said set of parameters comprising coefficients of said function. For example:

the video is a video bit stream generated by an encoder;

the learning based prediction method is compliant with ITU-T P.1203 recommendation of the type:

$$MOS_q = q_1 + q_2 * \exp(q_3 * \text{quant})$$

said set of parameters comprising the three coefficients q1, q2, q3 of said learning based prediction method; and "quant" being a quantization step of said encoder, i.e. a qualifying feature of the video in the sense of the disclosure.

In another embodiment, the learning based prediction method is a neural network, said set of parameters comprising the model of said neural network. For example, the neural network may be of the random forest type or of the support vector regression type.

In another embodiment, the learning based prediction method implements at least a first neural network and a second neural network of different types, and wherein:

one said set of parameters comprises a model of said first neural network; and another said set of parameters comprises a model of said second neural network.

In another embodiment, the learning based prediction method comprises a neural network, said set of parameters comprising parameters relating to the architecture of said neural network.

In one embodiment, the training method comprises a step of sending to the predicting system, information for deriving a new set of parameters from at least one said sets of parameters.

Correlatively, in this embodiment, the predicting method comprises a step of receiving information for deriving a new set of parameters from at least one said sets of parameters or from a predetermined set of parameters.

In one embodiment, the predicting method comprises deriving a new set of parameters from at least one basic set of parameters among the plurality of sets of parameters, wherein:

the new set of parameters should be selected in place of said at least basic one set of parameters for some determined values of said at least one selected feature;

the parameters of said new set of parameters being computed from the parameters of said at least one basic set of parameters.

In one embodiment, the parameters of the new set of parameters are weighted based on a distance between said at least one selection feature and a limit of application of said at least one basic set of parameters.

The disclosure also concerns a computer program comprising instructions configured to implement the steps of the training method mentioned above when said at least one computer program is executed by a computer.

The disclosure also concerns a computer program comprising instructions configured to implement the steps of the predicting method mentioned above when said at least one computer program is executed by a computer.

These programs can use any programming language, and be in the form of source code, object code, or intermediate code between source code and object code, such as in a partially compiled form, or in any other desirable form.

The disclosure also concerns a readable medium comprising at least one computer program of this set of computer programs.

The recording medium can be any entity or device capable of storing the program. For example, the support may include a storage means, such as a ROM, for example a CD ROM or a microelectronic circuit ROM, or also a magnetic recording means, for example a hard disk.

On the other hand, the recording medium can be a transmissible medium such as an electrical or optical signal, which can be carried via an electrical or optical cable, by radio or by other means. The program according to the disclosure can in particular be downloaded on an Internet-type network.

Alternatively, the recording medium can be an integrated circuit in which the program is incorporated, the circuit being adapted to execute or to be used in the execution of the method in question.

BRIEF DESCRIPTION OF THE DRAWINGS

Other characteristics and advantages of the present disclosure will emerge from the description given below, with reference to the appended drawings which illustrate exemplary embodiments thereof devoid of any limiting character. In the figures:

FIG. 1 represents a predicting system according to one embodiment of the disclosure;

FIG. 2 represents in flowchart the main steps of a predicting method according to one embodiment of the disclosure;

FIG. 3 represents a training system according to one embodiment of the disclosure;

FIG. 4 represents in flowchart the main steps of a training method according to one embodiment of the disclosure;

FIG. 5 represents a predicting system according to one embodiment of the disclosure in the context of video gaming;

FIG. 6A illustrates selected value of a parameter $p_{S,k}$ of a set of parameters according to the value of the selection feature $FEAT_S$ according to one embodiment of the disclosure.

FIG. 6B illustrates a method of deriving a set or parameters in a prediction system according to one embodiment of the disclosure;

FIG. 6C illustrates a method of deriving a set or parameters in a prediction system according to one embodiment of the disclosure;

FIG. 7 illustrates the hardware architecture of a predicting system according to one implementation of the disclosure; and FIG. 8 illustrates the hardware architecture of a training system according to one implementation of the disclosure.

DETAILED DESCRIPTION OF THE DISCLOSURE

FIG. 1 represents a predicting system PS according to one embodiment of the disclosure.

In this document, the reference VID may designate either an image or a video.

A purpose of the predicting system PS is to determine the objective quality score VQSo of an image or a video VID. A video VID may be:

- a source video SV captured by a camera or generated by a computer; or
- a decoded video DV containing decoded pixels of a video, the pixels being obtained by a decoder DEC decoding a video bit stream.

An image or video VID may be associated with metadata MTD related to the video.

The predicting system PS comprises a learning based prediction method (or learning based prediction model LBPM) configured to determine the objective quality score VQSo of an image or a video VID, from at least one feature $FEAT_Q$ associated with the image or the video VID, this feature $FEAT_Q$ being called hereafter a qualifying feature.

The learning based prediction method LBPM may be configured by a set of parameters $MOD_i$ selected among a plurality of sets of parameters $MOD_i$, $MOD_j$ in a database of parameters $DB_P$. This set of parameters $MOD_i$ may be determined from at least one feature $FEAT_S$ associated with the image or the video VID, this feature $FEAT_S$ being called hereafter a selection feature.

The learning based prediction method LBPM may be of different types.

In one embodiment, the learning based prediction method LBPM may comprise a function, the set of parameters $MOD_i$ used to configure the learning based prediction method LBPM comprising coefficients of this function.

For example, if the video VID is decoded from a video bit stream generated by an encoder, the learning based prediction method LBPM may be compliant with ITU-T P.1203 recommendation of the type:

$$MOS_q = q_1 + q_2 * \exp(q_3 * \text{quant})$$

each set of parameters MOD corresponding to a different set of (q1, q2, q3) parameters, the variable "quant" being a quantization step of said encoder, i.e. a qualifying feature $FEAT_Q$ associated with the video VID in the sense of the disclosure.

In another embodiment, the objective quality learning based prediction method LBPM is a neural network, for example a neural network of the random forest type or of the support vector regression (SVR) type and the different sets of parameters $MOD_i$ correspond to different models of this neural network.

In another embodiment, the learning based prediction method LBPM implements neural networks of different types and the different sets of parameters MODi may correspond to different models of these networks. For example:

- a first set of parameters $MOD_1$ may be a first model (or kernel) of a network of a SVR type;
- a second set of parameters $MOD_2$ may be a second model (or kernel) of the SVR type neural network; and
- a third set of parameters $MOD_3$ may be a set of coefficients/weights of a logistic regression model.

Thus, according to this embodiment, the learning based prediction method LBPM may be configured to implement different networks, with different models or coefficients.

In another embodiment, the learning based prediction method LBPM may be a neural network whose architecture may be configured according to different set of parameters $MOD_i$, $MOD_j$. For example, the number of layers may vary, so the complexity of the network.

The predicting system PS comprises a module for obtaining the at least one selection feature $FEAT_S$ and a module for obtaining the at least one qualifying feature $FEAT_Q$ of a image or video VID.

In this embodiment, a same module ME10 of the predicting system PS is configured to obtain the at least one selection feature $FEAT_S$ and the at least one qualifying feature $FEAT_Q$ associated with an image or a video VID, during a same operation or not.

In one embodiment, as least one feature associated with an image or a video VID obtained by the module ME10 may be used both:

- (i) as a selection feature $FEAT_S$ to select the set of parameters to configure the learning based prediction method LBPM for this image or video VID and
- (ii) as a qualifying feature $FEAT_Q$ to be used by the configured learning based prediction method LBPM to determine the objective quality score VQSo of this video image or VID.

The generic notation FEAT used hereafter designates a feature of a video VID obtained by the ME10 module and that may be used as a qualifying feature $FEAT_Q$ and/or as a selection feature $FEAT_S$ for this video.

In one embodiment, one feature FEAT is a bit rate of the video VID.

In one embodiment, one feature FEAT is a syntax element parsed from a video bit stream VBS.

In one embodiment, one feature FEAT comprises a syntax element parsed from a video bit stream VBS, such as:

- a type of codec used to generate the video bit stream VBS;
- a profile of the video bit stream VBS (Baseline Profile BP, Main Profile MP, Extended Profile XP, High Profile HiP, High 10 Profile Hi10P, High 4:2:2 Profile, High 4:4:4 Profile, . . . )
- a coding structure of the video bit stream VBS (for example: MPEG-4),
- the coding mode of the video bit stream (Intra, Inter, Skip, Merge, etc.).

In one embodiment, one feature FEAT comprises a syntax element corresponding to pixel residual information or motion vector residual information.

In one embodiment, one feature FEAT comprises values of pixels of a source video SV.

In one embodiment, one feature FEAT comprises values of decoded pixels, or values of decoded motion vectors of a decoded video DV.

In one embodiment, one features FEAT is metadata MTD associated with a video VID, such as an identifier of the video (e.g. the identifier of a video game), an identifier of a category of the video VID (e.g. a category of a video game), or any information that is not contained in the bit stream VBS or in the decoded video DV.

In one embodiment, one feature FEAT is metadata MTD associated with a video VID, this metadata MTD comprising a quality information obtained from another metric and computed in a previous stage.

In one embodiment, one feature FEAT is computed from features extracted from the image or video VID.

For example, one feature FEAT is a percentage of contours in the image or the video, this percentage being obtained by computation of edge based on the source or decoded pixels, for example using a Canny filter.

For example, one feature FEAT is obtained by computation of histograms based on decoded pixels, or computation of a mix between the number of intra coding modes and the bitrate of the video VID.

The predicting system PS comprises a module M20 for selecting, as a function of at least one selection feature $FEAT_S$ of a video VID obtained by the module ME10, a set of parameters $MOD_i$ among a plurality of sets of parameters $MOD_i$, $MOD_j$.

The learning based prediction method LBPM, when configured with this set of parameters $MOD_i$, may then determine the objective quality score VQSo of an image or of a video VID, using the qualifying feature $FEAT_Q$ obtained for this image or video.

FIG. 2 represents in flowchart the main steps of a predicting method PM according to one embodiment of the disclosure. This method may be executed to predict an objective quality score VQSo of an image or a video VID.

The predicting method comprises a step E10 of obtaining at least one selection feature $FEAT_S$ of the image or video VID.

The predicting method comprises a step E20 of selecting, as a function of said at least one selection feature $FEAT_S$, a set of parameters $MOD_i$ among a plurality of sets of parameters $MOD_i$, $MOD_j$. For example, a set of parameters is selected based on the at least one selection feature among a plurality of sets of parameters of a learning based prediction model (LBPM).

The selected set of parameters results from training the LBPM using training images or videos having the at least one selection feature.

The predicting method comprises a step E30 of determining the objective quality score VQSo of the image or video VID by using the learning based prediction method LBPM, from at least one qualifying feature $FEAT_Q$ associated with the image or video VID, the learning based prediction method LBPM being configured by said set of parameters MODi. For example, the objective quality score of the image or video is determined by applying the LBPM configured with the selected set of parameters, based on at least one qualifying feature associated with the image or video.

In one embodiment, the at least one qualifying feature $FEAT_Q$ used to determine the objective quality score VQSo may be the at least one selection feature $FEAT_S$ used to select the set of parameters $MOD_i$.

In another embodiment, the at least one qualifying feature $FEAT_Q$ used to determine the objective quality score VQSo differs from the at least one selection feature $FEAT_S$ used to select the set of parameters $MOD_i$.

In the embodiment of FIG. 2, the at least one qualifying feature $FEAT_Q$ may be obtained during step E10, at the time of obtaining the at least one selection feature $FEAT_S$ associated with the image or video VID. Alternatively, the at least one qualifying feature $FEAT_Q$ and the at least one selection feature $FEAT_S$ may be obtained during different steps.

In the embodiment of FIG. 2, if the predicting system PS fails to select a set of parameters at step E20, a default set of parameters $MOD_D$ stored in the database of parameters $DB_P$ is used to configure the learning based prediction method LBPM. For example, a new set of parameters is derived from at least one of the plurality of sets of parameters and the new set of parameters is selected instead of the at least one of the set of parameters for predetermined values of the at least one selection feature. The new set of parameters may be computed from the at least one of the plurality of sets of parameters.

FIG. 3 represents a training system TS according to one embodiment of the disclosure.

This training system TS aims at determining the plurality of set of parameters $MOD_i$, $MOD_j$ used by the predictive system of FIG. 1.

This training system is used for determining the different sets of parameters of the learning based prediction method from a set of images or videos. It implements a phase of training the learning based prediction method only by the images or videos of a said subset, to learn a set of parameters of said learning based prediction method, said subset comprising only the images or videos classified into a class selected as a function of at least one selection feature.

In the embodiment of FIG. 3, the training system TS comprises a database $DB_V$ comprising a set of images or videos VID, each image or video being associated with an expected quality MOS.

The training system TS comprises a module MF10 configured to obtain at least one selection feature $FEAT_S$ associated with each image or video VID of the database $DB_V$.

In this embodiment, this module MF10 is similar to the module ME10 of the predicting system PS described with reference to FIG. 3.

In one embodiment, for a given image or video VID, the at least one selection feature $FEAT_S$ associated with this image or video obtained by the module ME10 of the predicting system PS and by the module MF10 of the training system TS are identical.

In this embodiment, the training system TS comprises a module MF20 configured to classify each image or video VID of the database $DB_V$ into a class $C_i$ selected as a function of said at least one selection feature $FEAT_S$. The module MF20 constitutes a plurality of subsets $SE_i$, each subset $SE_i$ comprising only images or videos of a same class $C_i$.

The training system TS comprises a learning based prediction method LBPM, which is configured, when trained by a set of images or videos, to learn a set of parameters of the learning based prediction method LBPM, to minimize an error between:

(i) objective qualities scores VQSo of these images or videos calculated from at least one feature qualifying feature $FEAT_Q$ associates with of these images or videos; and (ii) expected qualities MOS associated with these images or videos.

The training system TS comprises a module configured to obtain the at least one qualifying feature $FEAT_Q$ of a video VID. In the embodiment of FIG. 3, the module MF10 of the training system PS is configured to obtain the at least one selection feature $FEAT_S$ and the at least one qualifying feature $FEAT_Q$ of a video VID.

In one embodiment, the learning based prediction method LBPM is trained independently for each subset SE comprising only the images or videos of a class $C_i$, these images or videos being classified according to the at least one selection feature $FEAT_S$ obtained for each of these videos. For each subset $SE_i$ (equivalently, for each class $C_i$) a set of parameters $MOD_i$ is learnt when the learning based prediction method LBPM is trained with the subset $SE_i$.

As shown, on FIG. 3, for each image or video of a subset $SE_i$, the at least one qualifying feature $FEAT_Q$ and the expected quality MOS of the image or video are provided to the learning based prediction method LBPM. The training of the learning based prediction method LBPM enables to determine the set of parameters $MOD_i$ of the learning based prediction method LBPM that minimizes an error, on the whole subset $SE_i$, between objective qualities scores VQSo of these images or videos calculated from at least one feature qualifying feature $FEAT_Q$ and the expected qualities MOS associated with these images or videos.

One set of parameters $MOD_i$ is obtained for each subset $SE_i$.

These set of parameters MODi may be stored in the database of parameters $DB_P$ of the predicting system.

FIG. 4 represents in flowchart the main steps of a training method TM according to one embodiment of the disclosure.

The training method TM comprises a step F10 of obtaining at least one selection feature $FEAT_S$ associated with each image or video VID from a set of images or videos.

The training method TM comprises a step F20 of classifying each image or video into a class Ci selected as a function of the at least one selection feature $FEAT_S$ obtained for said image or video. The original set of images or videos may be split into a plurality of subsets, each subset $SE_i$ comprising only images or videos of a class Ci. For example, each image or video is classified into a class based on the at least one selection feature of the respective image or video. For each class, a subset of the images or videos is identified comprising only images or videos classified into the respective class.

For each subset SEi of a plurality of subsets, the training method TM comprises a phase F40 of training the earning based prediction method LBPM only by the images or videos of one said subset SEi, to learn a set of parameters $MOD_i$ of said learning based prediction method LBPM such that, an error between:

(i) objective qualities scores VQSo of the images or videos of said subset calculated by said learning based prediction method LBPM, when configured with said set of parameters, from at least one qualifying feature $FEAT_Q$ associated with these images or videos; and (ii) expected qualities MOS associated with this images or videos;

is minimized. For example, the LBPM is trained only using the images or videos of the respective subset, to generate a set of parameters for the LBPM such that an error is minimized between (i) objective quality scores of the images or videos of the respective subset calculated by the LBPM, when configured with the generated set of parameters, based on at least one qualifying feature associated with the images or videos of the respective subset and (ii) expected qualities associated with the images or videos of the respective sub set.

Non-limiting examples of implementation of the disclosure are presented hereafter.

The disclosure may be used in the gaming context.

FIG. 5 presents a cloud-gaming service provider CGSP and a mobile phone MP.

The mobile phone MP is a system for predicting an objective score VQSo according to one embodiment of the disclosure. It implements a predicting method PM according to one embodiment of the disclosure.

In this scenario, a player uses the mobile phone MP to play a game through a cloud-gaming service provided by the cloud-gaming service provider CGS. The mobile phone receives an HEVC bit stream VB S, and an additional stream with metadata MTD containing a category gc of the game The mobile phone MP comprises a HEVC decoder to obtain a decoded video VID, the HEVC decoder comprising a HEVC parser HEVCP.

The mobile phone MP also comprises a metadata parser MTDP.

The HEVC parser HEVCP provides for each frame of the video VID the number nbpf of bits used by the frame.

The metadata parser MTDP obtains the category gc of the game from the metadata.

The category gc of the game and the number nbpf of bits used by a frame are two selection features $FEAT_S$ and two qualifying features $FEAT_Q$ of the video VID in the sense of the disclosure.

The combination of these parsers constitutes a module M10 for obtaining at least one selection feature $FEAT_S$ associated with the video VID and at least one qualifying feature $FEAT_Q$ associated with the video in the sense of the disclosure.

The mobile phone MP comprises a module ME20 for selecting, for each video frame, as a function of the two selection features gc and nbpf, a set of parameters $MOD_i$ among four sets of parameters $MOD_1$-$MOD_4$ stored in a database of set of parameters $BD_P$.

When configured with this set of parameters $MOD_i$, a bit-stream based learning based prediction method LBPM of the mobile phone MP, provides the objective quality score VQSo of the frame, by using the gc and nbpf features acting as two qualifying features $FEAT_Q$ of the video frame.

In this embodiment, the mobile phone MP sends the objective quality score VQSo per frame back to the cloud-gaming service provider CGSP for further analysis.

In this example of implementation of the disclosure, it is assumed that the cloud-gaming service provider CGSP has implemented a training method according to one implementation of the disclosure to design the bit stream based learning based prediction method LBPM and the four sets of parameters $MOD_1$-$MOD_4$.

To do so, videos of different games have been encoded at various bitrates to constitute a first set of videos, and each video has been associated with a subjective quality, more precisely to a Mean Opinion Score (expected quality in the sense of the disclosure).

Each video has been classified in a class $C_i$ selected among the four classes $C_1$-$C_4$ according to two selection features $FEAT_S$ corresponding to the category gc of the game and to the video bitrate. Four subsets of videos have been obtained, each subset $SE_i$ comprising only the videos of a given class $C_i$.

For each subset SE among the for four subsets $SE_1$-$SE_4$, the bit stream based learning based prediction method LBPM has been trained with the videos of the subset $SE_i$ associated to their expected qualities MOS to learn a set of parameters $MOD_i$ that minimizes an error between these expected qualities MOS and objective quality scores of these videos calculated by said bit stream learning based prediction method LBPM from at least one qualifying feature $FEAT_Q$ of these videos.

For example, the four set of parameters used in the training method and in the predicting method of this embodiment may be:

$MOD_1$: set of parameters of the LBPM bit stream based learning based prediction method for a game category gc "shooting and simulation" and a bitrate nbpf below 10 Mbps;

$MOD_2$: set of parameters of the LBPM bit stream based learning based prediction method for the game category gc "shooting and simulation" and a bitrate nbpf above 10 Mbps;

$MOD_3$: set of parameters of the LBPM bit stream based learning based prediction method for a game category gc other than "shooting and simulation" and a bitrate nbpf below 15 Mbps;

MOD4: set of parameters of the LBPM bit stream based learning based prediction method for a game category gc other than "shooting and simulation" and a bitrate nbpf above 15 Mbps.

The disclosure may be used in the context of 2D video.

In this scenario of another implementation of the disclosure, a user watches a basketball match on a ultrahigh definition television (UHD TV).

Typically, a sport picture will be made of natural content, captured by a 2D camera, and overlays such as text or graphics, so-called screen content.

The television receives a versatile video coding VVC bit stream VBS of a 2D UHD content and an additional stream with metadata MTD containing the type of content (natural content or screen content) for each block of the video.

In this embodiment the TV has an embedded VVC parser and VVC decoder. The VVC decoder provides decoded pixels corresponding to each image.

The MTD parser provides for each block of the decoded frame a selection feature $FEAT_S$ indicating whether the content is natural content or screen content.

The television comprises a module for selection, as a function of the content category $FEAT_S$:

a first SVR model $MOD_1$ for the natural content category; or a second SVR model $MOD_2$ for the screen content category.

The objective quality score of a block is computed by a learning based prediction method LBPM of a SVR type configured with selected first or second SVR model from at least one qualifying feature $FEAT_Q$ of the block (for example the pixels of the block).

In this embodiment, the television sends back the TV broadcaster for further analysis an objective quality score VQSo per frame obtained as an average of the scores computed for the blocks of the frame.

In this example, a standardization committee may design a learning based prediction method of the SVR type to evaluate the quality perceived by a customer for 2D content.

A set of UHD videos are used, encoded at various bitrates. The committee decides, based on experiments, to define two classes $CE_1$, $CE_2$ based on the nature of the content.

According to this feature, read from the metadata at the block level, two subsets $SE_1$, $SE_2$ are created, containing blocks of each type.

During the training process, the SVR learning based prediction method learns its model independently on each subset $SE_1$, $SE_2$, to create the two different models $MOD_1$, $MOD_2$. The learning may be made thanks to expected qualities corresponding to objective scores provided by a complex full reference metric, applied on the different blocs.

The disclosure may be used in the context of immersive video.

In this scenario of another implementation of the disclosure, a user watches an immersive video on a head mounted display, hereafter HMD.

The HMD receives an HEVC bit stream VBS that includes the nature of the immersive content.

The HMD is connected to a personal computer PC which has a learning based prediction method LBPM embedded to analyze what the user is watching. In this embodiment, the learning based prediction method LBPM may be configured to implement either a deep neural network with 50 layers, or a deep neural network with 100 layers or a SVR model.

The PC comprises an HEVC decoder and an HEVC parser.

The HEVC decoder provides decoded pixels corresponding to each image.

The HEVC parser obtains a selection feature $FEAT_S$ indicating whether the content is omnidirectional 360, omnidirectional 180 or perspective.

In this example, the PC comprises a module ME20 for selecting according to the selection feature $FEAT_S$, a set of parameters MOD as follows:

$MOD_1$: deep neural network with 50 layers for omnidirectional 360 content category;

$MOD_2$: deep neural network with 100 layers for omnidirectional 180 content category;

$MOD_3$: SVR model for perspective category.

Handling and displaying the omnidirectional 360 content is complex to process and time consuming. In this embodiment, it uses a deep learning approach with a reasonable amount of layers, as a tradeoff, to maintain real-time capabilities.

The omnidirectional 180 content is complex to process as well but less time consuming. It may use a deep learning approach with more layers.

The perspective content is more complex to process because it corresponds to multiple 2D camera captures. In this embodiment, it uses a simple SVR.

The objective quality scores are computed by the objective quality learning based prediction method LBPM from at least one qualifying feature $FEAT_Q$ associated with the video VID, and sent back to the service provider for further analysis.

In this example, an immersive video service provider may design a learning based prediction method to evaluate the quality perceived by a customer for immersive video content. A set of immersive videos are used, encoded at various bitrates.

In this example, according to some experiments, three classes are defined based on the nature of the content, that allow a good compromise between the time needed to handle the content, and the time allocated to the learning based prediction method computation.

The set of videos is divided into three subsets according to this selection feature (nature of content), read from the bit stream, each subset containing only the videos of each type.

For each class, a different algorithm is used:

deep neural network with 50 layers for omnidirectional 360 content category;

deep neural network with 100 layers for omnidirectional 180 content category;

SVR model for perspective category.

Each algorithm learns its model independently on each subset, to create the different models $MOD_i$, that are the output of the training process. The learning is made thanks to qualifying features $FEAT_Q$ of the videos and mean opinion scores (MOS) obtained from subjective tests associated to these videos.

In each embodiment of the disclosure described above, a plurality of sets of parameters $MOD_i$, $MOD_j$ was considered, each set of parameters corresponding to a given class obtained from a selection feature $FEAT_S$.

We will describe below how to derive/interpolate an additional intermediate set of parameters MOD k from existing models MODi, $MOD_j$ according to some particular embodiments of the disclosure.

One interest of such an interpolation is to simulate the existence of more set of parameters $MOD_k$ to obtain a better VQSo score due to a finer granularity of the models In two methods illustrated with reference to FIG. 6B and FIG. 6C, the derivation at the prediction stage.

We assume the existence of two sets of parameters $MOD_1$ and $MOD_2$, the first set of parameters $MOD_1$ being selected when the selection feature $FEAT_S$ is in a first range [min, F] and the second set of parameters $MOD_2$ being selected when the selection feature $FEAT_S$ is in a second range]F, max].

As a general notation, we note $p_{i,k}$ k=1, . . . N, the N parameters of the set $MOD_i$.

FIG. 6A represents the value of a parameter $p_{S,k}$ of a set of parameters selected according to the value of the selection feature $FEAT_S$:

if $FEAT_s$ in [min, F]: $p_{S,k}=p_{1,k}$;

if $FEAT_s$ in]F, max]: $p_{S,k}=p_{2,k}$.

We assume that the prediction system or method considers that the set of parameters $MOD_1$, $MOD_2$ are not accurate when the selection feature $FEAT_S$ in the range [B1, B2] and that when the selection feature $FEAT_S$ is in the range [B1, B2], the learning based prediction method LBPM should apply a set of parameters $MOD_k$ derived from the first and second set of parameters $MOD_1$, $MOD_2$.

In the example of FIG. 6B, the parameters $p_{r,k}$ of the derived set of parameters $MOD_k$ are the averages of the parameters of the first and second set of parameters. Thus, the value of a parameter $p_{s,k}$ of the model selected according to the value of the selection feature $FEAT_S$ is determined as follows:

if $FEAT_s$ in [min, B1[: $p_{s,k}=p_{1,k}$;

if $FEAT_s$ in [B1, B2]: $p_{S,k}=p_{r,k}=(p_{1,k}+p_{2,k})/2$ if $FEAT_s$ in]B2, max]: $p_{S,k}=p_{2,k}$.

In the example of FIG. 6C, the parameters $p_{r,k}$ of the derived set of parameters $MOD_k$ are weighted based on the distance between the selection feature $FEAT_S$ and the limits B1, B2 of the applications of the first and second set of parameters $MOD_1$, $MOD_2$. Thus, the value of a parameter $p_{s,k}$ of the model selected according to the value of the selection feature $FEAT_S$ is determined as follows:

if $FEAT_s$ in [min, B1 [: $p_{S,k}=p_{1,k}$;

if $FEAT_s$ in [B1, B2]: $p_{S,k}=p_{r,k}=(p_{1,k}\cdot(B2-FEAT_S)+p_{2,k}\cdot(FEAT_S-B1))/(B2-B1)$ if $FEAT_s$ in]B2, max]: $p_{s,k}=p_{2,k}$.

In another embodiment, the derivation of a new set of parameters $MOD_k$ is done by the training system TS, the training system providing means to the prediction system PS on how to compute the new set of parameters.

As mentioned before, during the step F20 of classifying each video VID into a class, a number NC of classes is considered, and the learning based prediction method LBPM is trained independently by the videos of the NC subsets of videos to learn NC set of parameters.

In this embodiment, a relatively great number NC of classes is chosen but not all the sets of parameters learnt for the NC subsets are provided to the prediction system.

On the contrary, in this embodiment, the training system TS:

- (i) computes functions to derive at least one of the NC sets of parameters (called "new set of parameters") from at least one basic set of parameters among the NC sets of parameters, and
- (ii) provides the prediction system PS at least with said at least one basic set of parameters and with said functions, making the prediction system possible to derive the new set of parameters from said basic set of parameters using said functions.

For example, referring back to the example of FIG. 6C, the training system may determine and provide the prediction system with the limits $B_1$, B2 used in the derivation function $p_{r,k}=(p_{1,k}\cdot(B2-FEAT_S)+p_{2,k}\cdot(FEAT_S-B1))/(B2-B1)$ FIG. 7 illustrates the hardware architecture of a predicting system PS according to one implementation of the disclosure. The predicting system PS may be in the form of a PC, or of a smartphone for example.

The predicting system PS comprises in particular a processor (processing circuitry) $\mathbf{1}_P$, a random access memory $\mathbf{3}_P$, a read-only memory $\mathbf{2}_P$, a non-volatile flash memory $\mathbf{4}_P$ as well as non-represented communication means.

The read-only memory $\mathbf{2}_P$ constitutes a non-transitory recording medium according to the disclosure, readable by the processor $\mathbf{1}_P$ and on which a computer program $PG_P$ according to the disclosure is recorded.

The computer program $PG_P$ defines the functional (and here software) modules of the predicting system PS.

In one embodiment, these functional modules comprise:

- the module ME10 for obtaining at least one selection feature selection $FEAT_S$ and at least one qualifying feature $FEAT_Q$ of a video VID;
- the module ME20 for selecting, as a function of said at least one selection feature $FEAT_S$, a set of parameters $MOD_i$ among a plurality of sets of parameters $MOD_i$, $MOD_j$;
- a learning based prediction method LBPM configured to determine the objective quality score VQSo of said video VID from the at least one qualifying feature $FEAT_Q$, said learning based prediction method LBPM being configured by said set of parameters $MOD_i$.

These functional modules may notably also comprise a video decoder.

FIG. 8 illustrates the hardware architecture of a training system TS according to one implementation of the disclosure. The training system TS may be in the form of a server for example.

The predicting system TS comprises in particular a processor (processing circuitry) $\mathbf{1}_T$, a random access memory $\mathbf{3}_T$, a read-only memory $\mathbf{2}_T$, a non-volatile flash memory $\mathbf{4}_T$ as well as non-represented communication means.

The read-only memory $\mathbf{2}_T$ constitutes a non-transitory recording medium according to the disclosure, readable by the processor $\mathbf{1}_T$ and on which a computer program $PG_T$ according to the disclosure is recorded.

The computer program PG T defines the functional (and here software) modules of the training system TS.

In one embodiment, these functional modules comprise:

- the module MF10 for obtaining at least one selection feature selection $FEAT_S$ and at least one qualifying feature $FEAT_Q$ of a video VID;
- the module MF20 configured to classify a video VID into a class $C_i$ selected as a function of said at least one selection feature $FEAT_S$ and to determine, for each said class $C_i$, a subset $SE_i$ comprising only videos of said class $C_i$;
- a learning based prediction method LBPM configured to learn, when trained only by the videos of one said subset SEi, a set of parameters $MOD_i$ of said learning based prediction method LBPM such that, an error between:
- (i) objective qualities scores VQSo of the videos of said subset SE calculated by said learning based prediction method LBPM, when configured with said set of parameters $MOD_i$, from the at least one qualifying feature $FEAT_Q$ of these videos; and
- (ii) expected qualities MOS associated with said videos; is minimized.

The term module (and other similar terms such as unit, submodule, etc.) in this disclosure may refer to a software module, a hardware module, or a combination thereof. A software module (e.g., computer program) may be developed using a computer programming language. A hardware module may be implemented using processing circuitry and/or memory. Each module can be implemented using one or more processors (or processors and memory). Likewise, a processor (or processors and memory) can be used to implement one or more modules. Moreover, each module can be part of an overall module that includes the functionalities of the module.

The use of "at least one of" in the disclosure is intended to include any one or a combination of the recited elements. For example, references to at least one of A, B, or C; at least one of A, B, and C; at least one of A, B, and/or C; and at least one of A to C are intended to include only A, only B, only C or any combination thereof.

The foregoing disclosure includes some exemplary embodiments of this disclosure which are not intended to limit the scope of this disclosure. Other embodiments shall also fall within the scope of this disclosure.

The invention claimed is:

1. A method of predicting an objective quality score of visual media, the method comprising:

obtaining at least one selection feature that is derived from media content of the visual media;

selecting, based on the at least one selection feature, a set of parameters among a plurality of sets of parameters of a learning based prediction model (LBPM), the selected set of parameters resulting from training the LBPM using training images or videos having the at least one selection feature; and determining the objective quality score of the visual media by applying the LBPM configured with the selected set of parameters, based on at least one qualifying feature that is derived from the media content of the visual media.

2. The method according to claim 1, further comprising deriving a new set of parameters from at least one of the plurality of sets of parameters, wherein:

the new set of parameters is selected instead of the at least one of the set of parameters for predetermined values of the at least one selection feature;

the new set of parameters are computed from the at least one of the plurality of sets of parameters.

3. The method according to claim 2, wherein parameters of the new set of parameters are weighted based on a distance between the at least one selection feature and a limit associated with the at least one of the plurality of sets of parameters.

4. The method according to claim 1, further comprising receiving information for deriving a new set of parameters from at least one of the plurality of sets of parameters.

5. The method according to claim 1, wherein a default set of parameters is selected when the set of parameters is not selectable based on the at least one selection feature.

6. The method according to claim 1, wherein the visual media is a source video or a decoded video obtained by decoding a video bit stream that includes encoded information of the visual media.

7. The method according to claim 1, wherein the at least one selection feature or the at least one qualifying feature is extracted either (i) from the visual media, or (ii) from metadata associated with the visual media, or (iii) computed from features extracted from the visual media.

8. The method according to claim 1, wherein the at least one selection feature or the at least one qualifying feature includes at least one of:

a syntax element extracted from a video bit stream that includes encoded information of the visual media; or a value calculated from the syntax element extracted from the video bit stream;

an element obtained by decoding the video bit stream;

a value calculated from the element obtained by decoding the video bit stream; and a value calculated from values of pixels of the visual media.

9. The method according to claim 1, wherein the LBPM comprises a function, and each of the plurality of sets of parameters comprise coefficients of the function.

10. The method according to claim 1, wherein the LBPM comprises a neural network, and each of the plurality of sets of parameters comprise parameters of the neural network.

11. The method according to claim 1, wherein the LBPM implements at least a first neural network and a second neural network of different types, and each of the plurality of sets of parameters comprises parameters of the first neural network and parameters of the second neural network.

12. A method of determining parameters of a learning based prediction model (LBPM) from a set of visual media including images or videos, the method comprising:

obtaining at least one selection feature that is respectively derived from media content of each visual media in the set of visual media;

classifying each visual media in the set of visual media into a class in a plurality of classes based on the at least one selection feature of the respective visual media;

identifying, for at least a first class in the plurality of classes, a first subset of the set of visual media that is classified into the first class, the first subset comprising first visual media that are classified into the first subset; and performing, for the first subset, a first training of the LBPM using the first visual media in the first respective subset, to generate a first set of parameters for the LBPM such that an error is minimized between:

(i) first objective quality scores of the first visual media of the first subset calculated by the LBPM, when configured with the generated first set of parameters, based on at least one qualifying feature associated with the first visual media the first subset; and (ii) expected qualities of the first visual media in the first subset.

13. The method according to claim 12, further comprising sending information for deriving the first set of parameters from a predetermined set of parameters.

14. The method according to claim 12, wherein the set of visual media are source visual media or a decoded visual media obtained by decoding a video bit stream that includes encoded information of the set of visual media.

15. The method according to claim 12, wherein the at least one selection feature or the at least one qualifying feature is extracted either (i) from the first visual media, or (ii) from metadata associated with the first visual media, or (iii) computed from features extracted from the first visual media.

16. The method according to claim 12, wherein the at least one selection feature or the at least one qualifying feature is:

a syntax element extracted from a video bit stream that includes the first visual media; or a value calculated from the syntax element extracted from the video bit stream;

an element obtained by decoding the video bit stream;

a value calculated from the element obtained by decoding the video bit stream;

a value that is calculated from values of pixels of the first visual media.

17. The method according to claim 12, wherein the LBPM comprises a function, and the set of parameters comprises coefficients of the function.

18. The method according to claim 12, wherein the LBPM comprises a neural network, and the set of parameters comprises parameters of the neural network.

19. The method according to claim 12, wherein the LBPM implements at least a first neural network and a second neural network of different types, and the first set of parameters comprises parameters of the first neural network and parameters of the second neural network.

20. An apparatus for predicting an objective quality score of visual media, the apparatus comprising:

processing circuitry configured to obtain at least one selection feature that is derived from media content of the visual media;

select, based on the at least one selection feature, a set of parameters among a plurality of sets of parameters of a learning based prediction model (LBPM), the selected set of parameters resulting from training the LBPM using training images or videos having the at least one selection feature; and determine the objective quality score of the visual media by using applying the LBPM configured with the selected set of parameters, based on at least one qualifying feature that is derived from the media content of the visual media.

* * * * *